Sept. 3, 1940.  P. S. HARPER ET AL  2,213,812
ORIFICE FITTING
Filed June 26, 1937   2 Sheets-Sheet 1
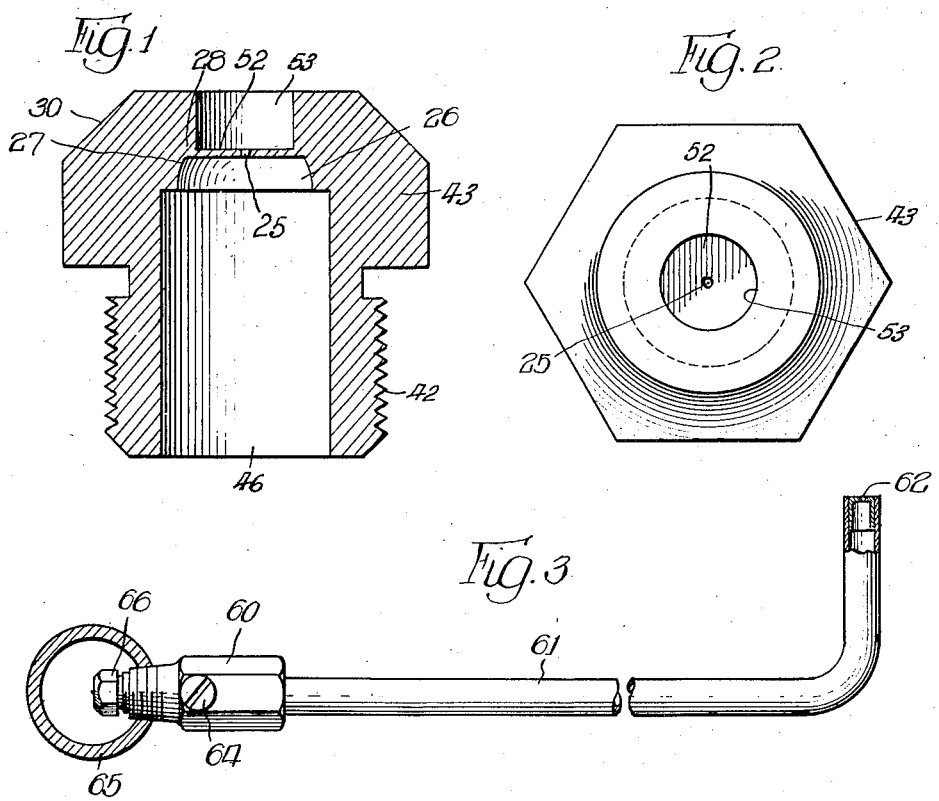
Inventors:
Philip S. Harper,
George F. Turner,
By Wilkinson, Huxley, Byron, Knight attys

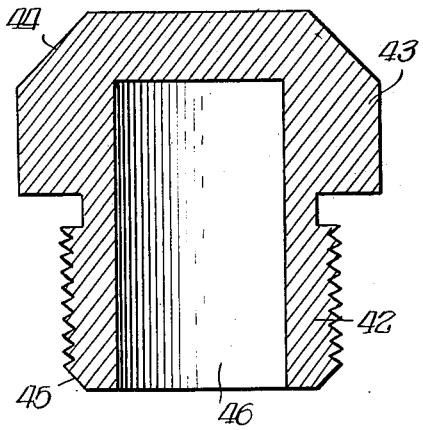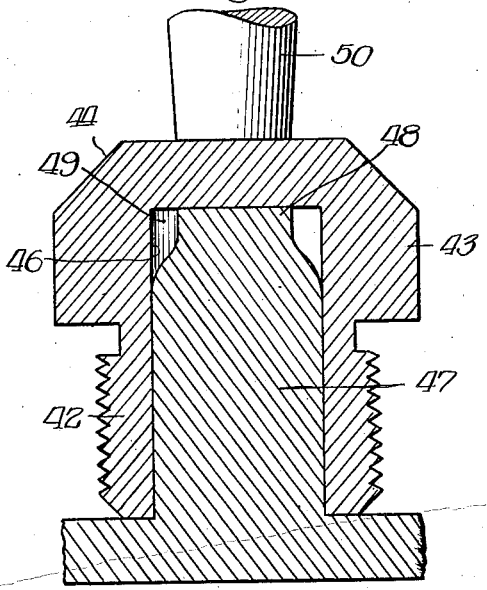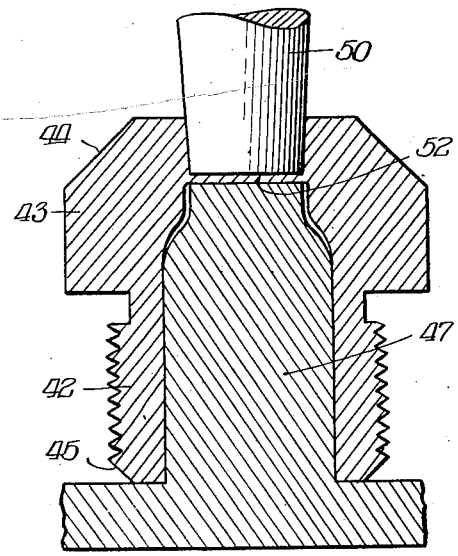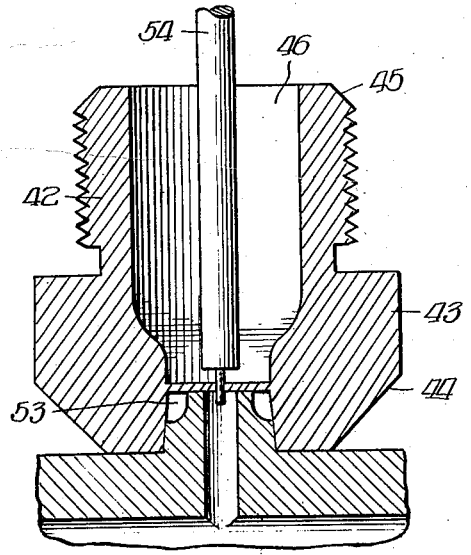

Patented Sept. 3, 1940

2,213,812

UNITED STATES PATENT OFFICE 2,213,812

ORIFICE FITTING

Philip S. Harper and George F. Turner, Chicago, Ill., assignors to Harper-Wyman Company, a corporation of Illinois Application June 26, 1937, Serial No. 150,486

1 Claim. (Cl. 138—44)

This invention relates to new and improved orifice fittings of the type characterized as having minute but accurately formed orifices therein such as are adapted for controlling the flow of small quantities of gases.

The invention also relates to various devices employing such fittings and other structural elements to form new and improved combinations such as pilots for gas stoves, gas valves, and similar devices.

The process herein disclosed is particularly characterized as productive of very small fittings of the type referred to having minute orifices therein, of between approximately .002 and approximately .015 of an inch in diameter. Methods heretofore employed for producing orifice fittings are not adapted for the production of fittings having the relatively small orifices of the size below approximately .015 of an inch and consequently it is an object of this invention to provide a process which is highly practical in commercial operation and yet is productive of fittings having minute orifices, as for instance: approximately .004 of an inch and of a high degree of uniformity throughout the various fittings produced.

It is a further object of this invention to provide fittings of novel construction which are equipped with very small orifices and which are so disposed in the fittings as to be protected from damage and from the likelihood of becoming clogged by dirt and other foreign matter.

A further object of this invention is to provide novel combinations employing the fittings referred to such as pilots for gas stoves, valves and like devices.

With many gases now employed for gas stoves and like devices adequate control for the gas is provided without resorting to orifice fittings having minute orifices of the type referred to in this invention, namely, those of a size below approximately .015 of an inch in diameter. However, with certain gases, such as for instance, propane gas, which is characterized as having a very high B. t. u. content per unit volume, the desired performance for pilots and other low burning devices requires a more restricted flow of the gas and thus requires orifice fittings having orifices which are much smaller and which are less than .015 of an inch in size. For instance, it has been found that propane gas which is now sold on the market as "bottled gas" when supplied to the pilot light of an ordinary gas stove, requires the restriction provided by an orifice in the neighborhood of approximately .004 of an inch. As fittings of the type referred to are designed for purposes of control, it is apparent that great accuracy in the size of the orifice is necessary and that it also becomes necessary that uniformity of the orifice openings throughout all of the fittings likewise be produced.

The nature of this invention will be better understood from the following detailed description of one form thereof which is described in connection with the accompanying drawings which illustrate various steps of the process as well as preferred constructions for orifice fittings and devices employing such fittings in their combination.

In the drawings:

Figure 1 is an enlarged cross sectional view of an orifice fitting constructed in accordance with this invention;

Figure 2 is a plan view of the orifice fitting shown in Figure 1;

Figure 3 is an elevational view partly in cross section of a gas stove pilot embodying in its construction, an orifice fitting constructed in accordance with this invention;

Figures 4, 5, 6 and 7 represent, respectively, various steps in the manufacture of orifice fittings in accordance with this invention.

By referring to Figures 1 and 2 it will be noted that the orifice fitting here illustrated comprises the head portion 43 which is preferably formed with straight sides so as to be readily fitted to a wrench or other suitable tool, and a threaded portion 42, which is adapted to connect with the associated parts of the device with which the fitting is adapted to be used. The fitting is further provided with a relatively large central opening 46 which extends inwardly from the threaded end thereof and with a smaller opening 53 extending inwardly from the opposite end. The openings 46 and 53 are separated by a relatively thin metal partition 52 which is provided with an orifice 25 to provide the limited gas flow for the use to which the fitting is to be put.

The orifice 25 is preferably produced by a punch which is of such limited size that it produces orifices of between approximately .002 of an inch and .015 of an inch and in operation, it produces a clean cylindrical opening by a shearing action and ejects a clearly cut disk. This of course necessitates a partition 52 of limited thickness determined by the diameter of the opening to be punched therethrough.

Referring now to the operations illustrated in Figures 4 to 7, inclusive, it will be noted that the partition is formed as an integral part of the fitting itself rather than as a separate disk secured by swedging.

The fitting in its initial condition, may be produced on a screw machine from non-round stock so as to provide a reduced threaded portion 42, a hexagonal or other shaped head 43, the bevelled corners 44 and 45 and the central opening 46. The fitting so formed is next placed on a holding and forming pin 47 in the manner shown in Figure 5. It will be noted that this pin has a reduced upper portion 48, which provides a space 49 adjacent the upper portion of the opening 46 into which the displaced metal may flow. After the fitting is placed on the pin 47, a punch 50 is caused to move downwardly and engage the upper surface of the fitting and continue downwardly until it assumes the position shown in Figure 6. It will be noted that this punch forces its way into the metal of the fitting causing the same to be displaced and to flow into the space 49 provided around the upper end of the holding and forming pin 47. The punch 50 has tapered sides so that it may be readily removed from the depression in the fitting which it forms. Here again it will be apparent that the holding and forming pin 47 may move upwardly with the fitting into cooperative engagement with a stationary punch 50 or the punch 50 may be moved down upon the stationary holding and forming pin 47. In either case the parts are so adjusted as to produce a partition 52 between the space 46 in the fitting and the depression 53. Thereafter, the fitting so produced is punched by means of a punch 54 in a manner substantially as shown in Figure 7.

It has been found that all minute orifices of any desired size up to .030 of an inch or greater can be produced with a high degree of accuracy by the method herein described and that results are obtainable by punching which are not obtainable by any other method known for producing fittings of this type.

Referring now to Figure 3, it will be noted that the pilot for gas stoves illustrated comprises a valve 60, which has connected to one end thereof, a pilot tube 61, terminating in an upwardly extending position having a small burner opening 62 therein. The valve 60 is preferably equipped with a control valve 64 by which the flow of gas may be entirely cut off. The amount of gas which flows from the main supply pipe 65 however, to the pilot burner 62 is controlled by the orifice fitting 66 attached to the inlet end of the valve 60 and which is constructed in accordance with this invention. In this case, the flow would be controlled by the minute orifice 25 shown in Figure 1, punched through the partition 52 of the fitting.

From the foregoing it will be apparent that the applicant has provided a new and useful orifice fitting which is suitable for accurately controlling the flow of minute quantities of gas.

It will further be apparent that fittings of new and useful construction are produced which not only may have minute orifices ranging from approximately .002 to .015 of an inch and of uniform size but also partitions located inwardly of the outer surface of the fitting whereby the orifice is protected from damage and from the likelihood of becoming inadvertently clogged by dirt or other foreign material.

We claim:

An orifice fitting for restricting the flow of combustible gas to a pilot burner, comprising a cylindrical body having a pair of bores extending inwardly from each end thereof and separated by a diaphragm-like partition formed integrally with said body, and having a gas passage therethrough of a size less than approximately .015 of an inch diameter.

PHILIP S. HARPER.
GEORGE F. TURNER.